United States Patent [19]

Forsyth et al.

[11] Patent Number: 5,325,407
[45] Date of Patent: Jun. 28, 1994

[54] CORE BARREL AND SUPPORT PLATE ASSEMBLY FOR PRESSURIZED WATER NUCLEAR REACTOR

[75] Inventors: David R. Forsyth, Irwin; Bruce W. Bevilacqua, Export; Charles H. Boyd, Plum Borough; Gregory L. Calhoun, Washington Twp., Westmoreland County all of Pa.

[73] Assignee: Westinghouse Electric Corporation, Pittsburgh, Pa.

[21] Appl. No.: 34,988

[22] Filed: Mar. 22, 1993

[51] Int. Cl.⁵ .................................. G21C 13/00
[52] U.S. Cl. ........................... 376/205; 376/463
[58] Field of Search .............. 376/205, 260, 463; 976/DIG. 178, DIG. 188

[56] References Cited

U.S. PATENT DOCUMENTS

| | | | |
|---|---|---|---|
| 3,660,231 | 5/1972 | Fox et al. | 376/384 |
| 4,082,608 | 4/1978 | Curet | 376/400 |
| 4,100,021 | 7/1978 | Silverblatt | 376/463 |
| 4,166,003 | 8/1979 | Bhattacharyya et al. | 376/398 |
| 4,678,623 | 7/1987 | Malandra et al. | 376/260 |
| 5,053,189 | 10/1991 | Chrise et al. | 376/353 |
| 5,217,681 | 6/1993 | Wedellsborg et al. | 376/294 |

*Primary Examiner*—Donald P. Walsh
*Assistant Examiner*—Meena Chelliah

[57] ABSTRACT

Disclosed is a means for increasing coolant flow through the areas adjacent to where the removable top head closure is bolted to the body of pressurized water nuclear reactor. A circumferential plenum for coolant is provided between the upper flange of the core barrel, the inner wall of the pressure vessel body and the upper circular support plate and providing a plurality of orifices for coolant in the upper flange of the core barrel and the upper circular support plate whereby a coolant may be circulated through the core barrel flange, the circumferential plenum and the upper support plate and into the space enclosed by the removable top closure head.

4 Claims, 3 Drawing Sheets

CORE BARREL AND SUPPORT PLATE ASSEMBLY FOR PRESSURIZED WATER NUCLEAR REACTOR

BACKGROUND OF THE INVENTION

This invention relates to pressurized water nuclear reactors. It relates particularly to the construction of the core barrel and upper support plate assembly used in a pressurized water nuclear reactor.

A pressurized water nuclear reactor power station contains a closed loop of pressurized water which removes heat energy from a nuclear core and transfers the heat energy to a secondary water system used to generate steam. The steam, in turn, drives a turbine generator set to produce electric power. The nuclear reactor system is comprised of a pressure vessel containing the nuclear fuel which generates the heat energy, a steam generator in which the heat energy from the nuclear reactor is used to generate steam, a circulating pump which circulates the coolant and a pressurizer that maintains and controls the pressure within the system.

The nuclear reactor assembly is generally comprised of a steel pressure vessel having a body and a removable top head, a thermal shield within the pressure vessel body, an upper support plate, several core support plates, a core barrel, and control rods and the nuclear fuel making up the core.

Certain components of the nuclear reactor assembly, after years of service, may develop primary water stress corrosion cracking. If such cracking occurs in pressure boundary components, the potential to generate leak paths for the pressurized water coolant exists. Such leak paths could lead to a leakage of coolant water outside the pressure vessel and into the surrounding containment building, thereby creating a potential hazard.

Alloy 600 is a material used in many reactor components. The reduction in temperature of the structural material is recognized as one method to reduce the susceptibility of a material to primary water stress corrosion cracking. The reactor vessel head is fitted with penetration tubes fabricated from ally 600. The penetration tubes allow access through the reactor vessel head for instrumentation and control mechanisms.

With new construction additional cooling manifolds and coolant passages can be built into various components to remove additional heat and reduce the temperature of the penetration tubes during operation. Such modifications would be quite difficult and expensive to use with nuclear reactors already in service, due to the fact that the interior of the reactor pressure vessel body, the removable top head and other internal components are radioactive.

SUMMARY OF THE INVENTION

It is therefore an object of this invention to provide an improved cooling system and method for a pressurized water nuclear reactor in the area where the penetration tubes are contained in the removable top head.

It is a further object of this invention to provide an improved cooling system and method for a pressurized nuclear reactor which can be easily and safely installed on pressurized water nuclear reactors already in service.

It is a still further object of this invention to provide an improved cooling system and method for a pressurized nuclear reactor which will reduce the potential for stress corrosion cracking in susceptible components of the reactor.

Other and further objects of this invention will become apparent from the following detailed description and the accompanying drawings and claims.

It has been discovered that the foregoing objects can be attained by providing a circumferential plenum for coolant between the upper flange of the core barrel, the inner wall of the pressure vessel body and the upper circular support plate and providing a plurality of orifices for coolant in the upper flange of the core barrel and the upper circular support plate whereby coolant may be circulated through the core barrel flange, the circumferential plenum and the support plate and into the space enclosed by the removable top closure head.

BRIEF DESCRIPTION OF THE DRAWINGS

FIGS. 4 and 5 are enlarged sectional views of the two portions, similar to those shown in FIGS. 2 and 3, around the circumference of a pressurized water nuclear reactor assembly using the improved cooling system of this invention in the area where the pressure vessel body and the removable top head closure are bolted together.

DESCRIPTION OF THE PREFERRED EMBODIMENT

Figure 1:
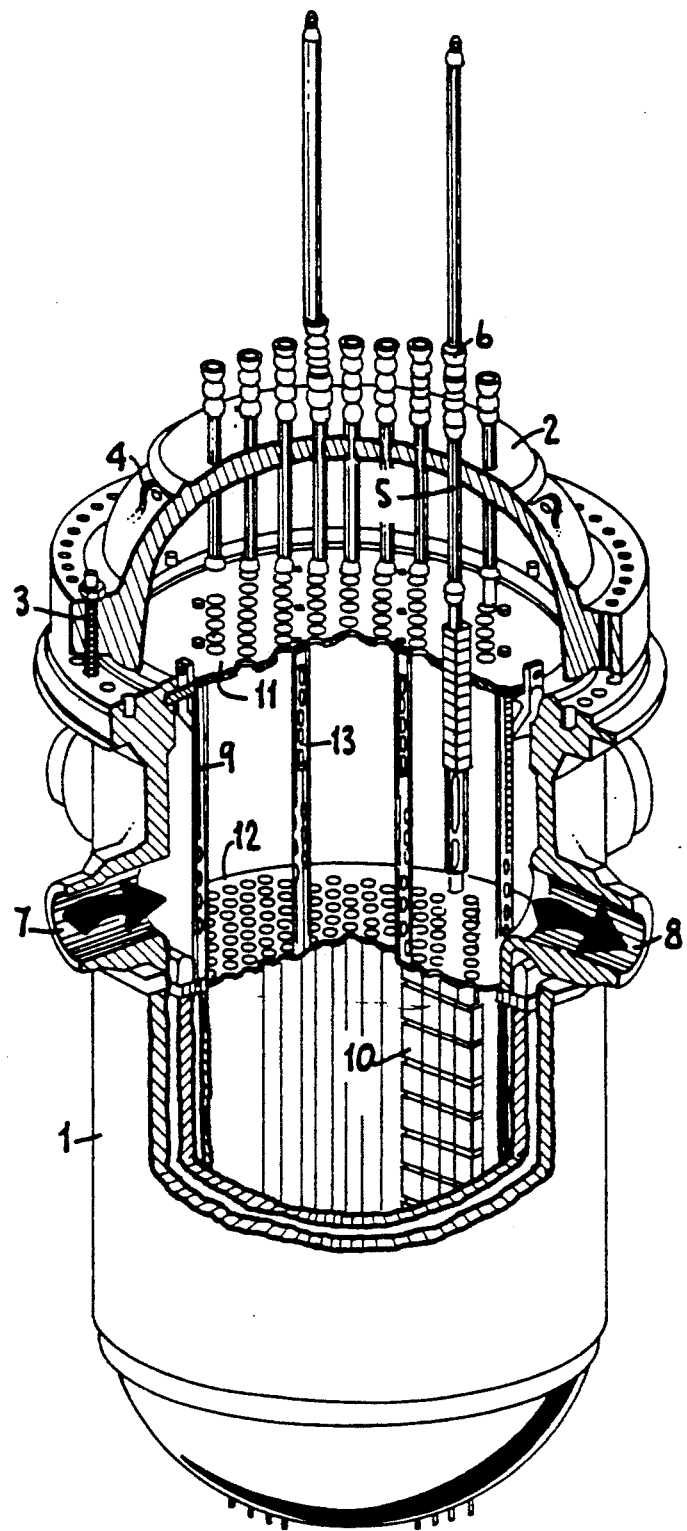
FIG. 1 is an isometric view, partly in section, of a typical pressurized water nuclear reactor assembly.

FIG. 1 illustrates the various components of a typical pressurized water nuclear reactor assembly for which this invention is applicable. The reactor assembly is comprised generally of a cylindrical steel pressure vessel body 1 having a removable top head closure assembly 2, each provided with cooperating flanges that can be bolted tightly together by a plurality of bolts 3 when the reactor is in service. The removable top head closure assembly 2 is provided with lifting lugs 4 to permit its removal for refueling of the reactor and with a plurality of penetration tubes 5 to accommodate the control rod drive mechanism 6 or act as instrumentation ports for thermocouples or other control instrumentation.

The pressure vessel body 1 is provided with a coolant water inlet nozzle 7, a coolant water outlet nozzle 8, and a cylindrical core barrel 9. The water coolant enters the pressure vessel body 1 through the inlet nozzle 7 and flows down the annulus between the core barrel 9 and the inner wall of the pressure vessel body 1. The coolant is then directed upwardly at the bottom of the pressure vessel body 1 and flows upwardly through the fuel elements 10, a core plate 12 and out of the vessel body 1 through the outlet nozzle 8 to the steam generator (not shown). A portion of the coolant is allowed also to circulate around other components of the reactor assembly, including the interior of the removable top head closure assembly 2.

The interior of the vessel body 1 is also provided with an upper support plate Il in the area where the top head closure assembly 2 is attached to the vessel body 1. The upper support plate 11 and the core plates 12 are provided with a plurality of spaced, aligned openings to receive the fuel assemblies and control rods which comprise the core and to accommodate the control rod drive mechanisms 6 spaced above the core and used to raise or lower the control rods that control the operation of the reactor. Structural support columns 13 are used to support upper support plate 11 and keep it in alignment with the core plate 12.

The above described components inside the vessel body 1 and the top head closure assembly 2 are made of austenitic stainless steel, Inconel or one of the zirconium alloys. The vessel body itself 1 and the top head closure assembly 2 are usually made of a low-alloy carbon steel clad with austenitic stainless steel or Inconel and are built to ASME pressure vessel codes.

Figure 2:
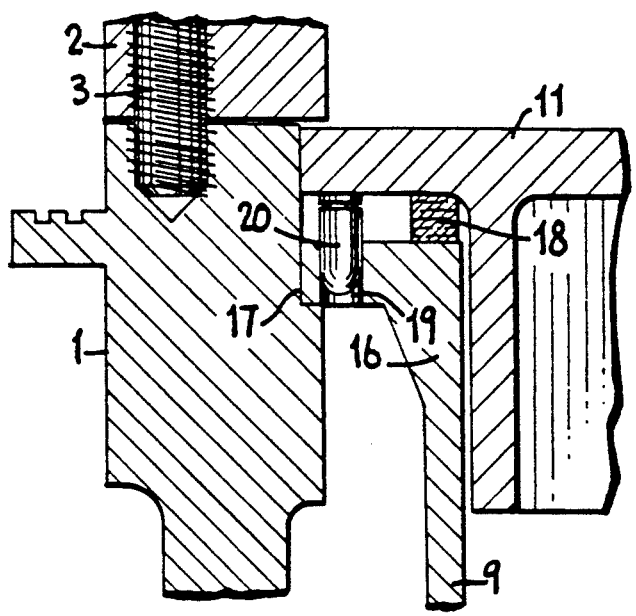
FIGS. 2 and 3 are enlarged sectional views of two portions around the circumference of a prior art pressurized water nuclear reactor assembly in the area where the pressure vessel body and the removable top head closure are bolted together.
Figure 3:
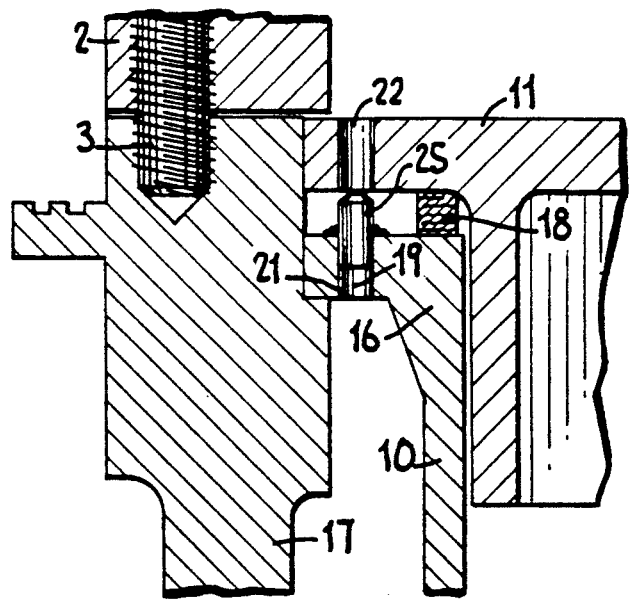

FIGS. 2 and 3 illustrate two different portions around the circumference of a prior art pressurized water nuclear reactor assembly in the area where the pressure vessel body 1 and the removable top head closure assembly 2 are bolted together. As shown in FIG. 2, the core barrel 9 was provided at its upper end with a circumferential horizontal flange 16 at its upper end which supported the core barrel 9 on a circumferential ledge 17 on the inner wall of the vessel body 1. The upper support plate 11 was positioned at the top of the vessel body 1 in a spaced relationship on top of the circumferential flange 16 of the core barrel 10 by a spring 18. A plurality of holes 19 were drilled in the core barrel flange 16 spaced around its circumference to receive specimen plugs 20 made of metal. The specimen plugs 20 were able to be removed when the top head closure 2 was unbolted and it and the upper support plate 11 lifted off for refueling. When the specimen plugs 20 were removed, the maintenance personnel could retrieve specimen capsules mounted on the exterior of the core barrel 9. The specimen plugs 20 are replaced when the reactor assembly is reassembled after refueling.

FIG. 3 illustrates a second portion around the circumference of the core barrel flange 16 of a prior art pressurized water reactor in which a plurality of equally spaced countersunk holes 21 were drilled in the core barrel flange 16 to receive a plurality of spray nozzles 25 which projected coolant water through cooperating holes or orifices 22 drilled in the outer portion of the upper support plate 11 to convey coolant water up into the area above the upper support plate 11 when enclosed by the top head closure assembly 2.

Figure 4:
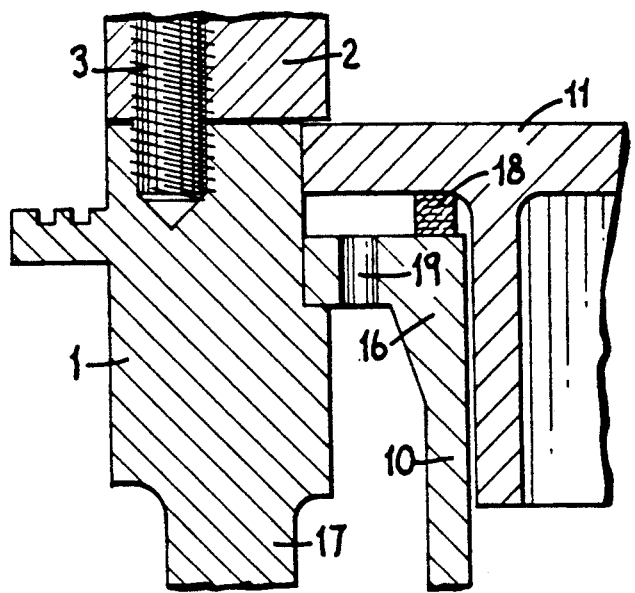
Figure 6:
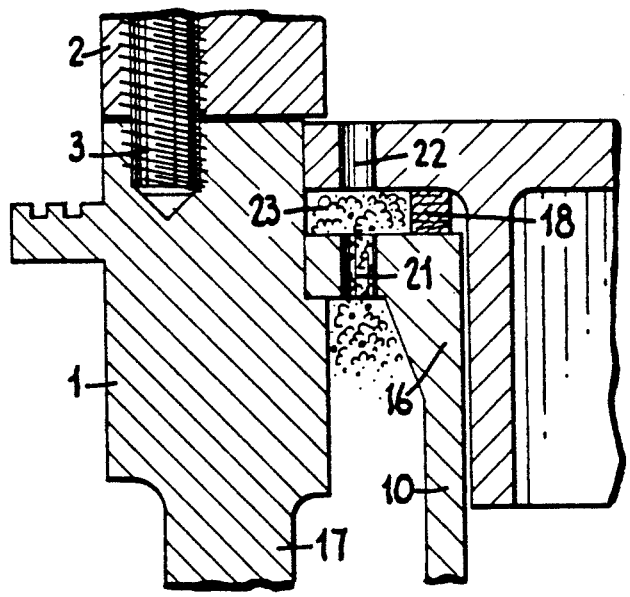

FIGS. 4 and 5 show portions of the reactor assembly similar to those shown in FIGS. 2 and 3, which illustrate a prior art reactor, but FIGS. 4 AND 5 illustrate a preferred embodiment of this invention. As shown in FIGS. 4 and 5, the specimen plugs 20 and spray nozzles 25 are permanently removed in this embodiment, leaving only the holes or orifices 19, 21 and 22 and creating a plenum 23 between the core barrel flange 16, the spring 18, the inner wall of the vessel body 1 and the upper support plate 1 which extends all around the inside periphery of the vessel body 1. The holes or orifices 19, 21 and 22 and plenum 23 provide a means by which an increased amount of the coolant may be circulated through the core barrel flange 16, the plenum 23 and the upper support plate 11 and into the space enclosed by the removable top closure member assembly. Since the orifices in the core barrel flange 16 are not axially aligned with corresponding orifices in the upper support plate 11, the coolant water must flow circumferentially in the plenum until it reaches an outlet orifice 22 in the upper support plate 11, thereby significantly increasing the cooling of the components in this area. If necessary, any of the holes or orifices 19, 21 and 22 may be increased in diameter to provide for additional coolant flow in this area.

This invention allows existing pressurized water nuclear reactors to be easily modified during a routine refueling operation, to greatly reduce the risk of future stress corrosion cracking in various critical components of the reactor assembly.

While we have described this invention by illustrating and describing the preferred embodiment of it, we have done this by way of example, and are not to be limited thereby as there are modifications and adaption that could be made within the teachings of this invention.

We claim:

1. A core barrel and support assembly for use in a pressurized water nuclear reactor having a removable top closure head secured to the reactor vessel body comprising:
   (a) a cylindrical core barrel spaced inwardly from the inner wall of said reactor vessel body and having a circumferential horizontal flange at the upper end thereof which supports said core barrel on a circumferential ledge on the inner wall of said reactor vessel body;
   (b) a circular support plate for supporting control rod assemblies contained within said reactor vessel body and positioned at the top of said reactor vessel body in a spaced relationship on top of said circumferential flange of said core barrel to provide a circumferential plenum between said core barrel flange, said inner wall of said reactor vessel body and said circular support plate; and
   wherein said core barrel flange and said support plate each include a plurality of orifices adapted to receive a coolant circulated through said core barrel flange, said circumferential plenum and said support plate and into the spaced enclosed by said removable top closure head.

2. The core barrel and support plate assembly of claim 1 in which said orifices are spaced around the circumference of said core barrel flange.

3. The core barrel and support plate assembly of claim 1 in which some of the orifices in said core barrel flange are not axially aligned with the orifices in said circular support plate.

4. The core barrel and support plate assembly of claim 1 in which the support plate is held in a spaced relationship with respect to said core barrel by a spring.

* * * * *